United States Patent
Hachadorian

(10) Patent No.: US 8,991,645 B2
(45) Date of Patent: Mar. 31, 2015

(54) DEVICE HAVING A HINGED COVER AND AT LEAST ONE FLEXIBLE ELEMENT

(75) Inventor: Gary Hachadorian, Frankfurt am Main (DE)

(73) Assignee: Hachadorian Design & Calculation GmbH, Frankfurt am Main (DE)

( * ) Notice: Subject to any disclaimer, the term of this patent is extended or adjusted under 35 U.S.C. 154(b) by 0 days.

(21) Appl. No.: 14/126,789

(22) PCT Filed: May 12, 2012

(86) PCT No.: PCT/EP2012/058777
§ 371 (c)(1),
(2), (4) Date: Dec. 16, 2013

(87) PCT Pub. No.: WO2012/171733
PCT Pub. Date: Dec. 20, 2012

(65) Prior Publication Data
US 2014/0131356 A1 May 15, 2014

(30) Foreign Application Priority Data

Jun. 16, 2011 (DE) .......................... 10 2011 051 107
Mar. 9, 2012 (DE) ..................... 20 2012 100 856 U

(51) Int. Cl.
*H02G 3/14* (2006.01)
*H01R 13/447* (2006.01)
*H01R 13/52* (2006.01)

(52) U.S. Cl.
CPC ............... *H02G 3/14* (2013.01); *H01R 13/447* (2013.10); *H01R 13/5213* (2013.01)
USPC ............................ 220/830; 220/827; 220/4.02

(58) Field of Classification Search
CPC ........ B65D 45/22; B65D 45/20; B65D 45/16;
B65D 45/025; B65D 45/28; B65D 55/04;
B65D 51/26; B65D 45/08; B65D 43/166;
B65D 43/163; B65D 43/16; H02G 3/14;
H02G 3/08
USPC ......... 220/830, 829, 827, 810, 326, 324, 315, 220/323, 242, 241, 834, 833, 832, 831; 16/226, 225
See application file for complete search history.

(56) References Cited

U.S. PATENT DOCUMENTS

| | | | |
|---|---|---|---|
| 4,036,396 A | 7/1977 | Kennedy | |
| 5,501,607 A | 3/1996 | Yoshioka et al. | |
| 5,747,739 A | 5/1998 | Moeller | |
| 6,021,606 A | 2/2000 | Kos | |

FOREIGN PATENT DOCUMENTS

| | | |
|---|---|---|
| DE | 11 41 714 B | 12/1962 |
| DE | 18 80 788 U | 10/1963 |
| DE | 76 00 675 U1 | 5/1976 |
| DE | 88 00 544 U1 | 3/1988 |
| DE | 38 09 289 A1 | 9/1989 |
| DE | WO 95/28757 A1 | 10/1995 |
| DE | 10 2004 056 009 A1 | 9/2005 |
| DK | WO 2010-060432 A1 | 6/2010 |

OTHER PUBLICATIONS

International Search Report mailed Aug. 1, 2012 in PCT/EP2012/058777.

*Primary Examiner* — Robert J Hicks
(74) *Attorney, Agent, or Firm* — Maier & Maier, PLLC

(57) ABSTRACT

The invention relates to a device including a hinged cover, which is pivotable about an axis of rotation out of a closed final position into an open final position, and a flexible element, which acts on the hinged cover with a force along a spring line of action. The flexible element is axially loaded in at least one final position of the cover and is loaded with transverse forces in bending or extension in at least one further position. In the open position of the cover, the spring line of action approaches the axis of rotation of the cover or lies substantially on the axis of rotation of the hinged cover, the spring line of action coincides with the axis of rotation of the cover such that the cover can be fixed in the open final position.

11 Claims, 10 Drawing Sheets a)

b)

a)

b)

a)

b)

DEVICE HAVING A HINGED COVER AND AT LEAST ONE FLEXIBLE ELEMENT

BACKGROUND OF THE INVENTION

1. A. Field of the Invention

The present invention relates to a device comprising a hinged cover which is pivotable about an axis of rotation out of a closed final position into an open final position, and a flexible element which acts on the hinged cover with a force along a spring line of action. The flexible element is axially loaded in at least one final position of the hinged cover and is loaded with transverse forces in bending or extension in at least one further position. In the open position of the cover, the spring line of action approaches the axis of rotation of the cover or lies substantially on the axis of rotation of the hinged cover such that the cover can be fixed in the open final position. Alternatively, in the open position of the cover, the spring line of action coincides with the axis of rotation of the cover such that the cover can be fixed in the open final position. The invention also relates to an electrical power socket, which is covered by a spring-loaded hinged cover and comprises a device according to the invention.

2. B. Related Art

The present invention is preferentially but not exclusively used for electric sockets which have a spring loaded rotational cover for the protection against external influences.

Self-closing spring-loaded hinged covers are often used for the protection of electric sockets. In particular vehicles, for example delivery vans, can be equipped with such a socket whose insertion opening is located on the outside of the vehicle for the purpose of supplying energy to a towed vehicle or using an externally located electric motor. A self-closing spring-loaded hinged cover is employed on such a socket in order to prevent the entry of water and dust through the insertion opening. Using a spiral cylindrical torsion spring in such a vehicle socket cover subjects the hinged cover to a force in the closing direction, which safely closes the insertion opening when the socket is not in use.

For example, DE 38 09 289 A1 describes the socket of an electrical connection pair for the electrical connection of trailer and its towing vehicle, whereby the hinged cover of the socket automatically closes when the plug is disengaged by means of a spring connected to the socket housing on one end, while the spring engages with a free bracket in the middle part of the hinged cover on the other end.

When using a coil spring, the force, which acts on a hinged cover, is greater when the hinged cover is open and weaker when the hinged cover is closed. When such a device is used outside, the active force or preloading force of the spring is very strong such that the hinged cover is held in a closed position and can't move in the opening direction due to the effects of the injection pressure used in high pressure washing water or caused by vibrations during driving. However, the maximum preloading force of the spring is limited by the risk of injury to the user.

To circumvent this problem, DE 10 2004 056 009 A1 proposes a vehicle socket cover, comprising torsion coil springs which act with a force on the cover, and sliding contact surfaces to dampen the active forces. Therefore, the hinged cover and a cover main body comprise several sliding-contact surfaces, being constrained into a force-closed roll-side joint and a sliding contact, immediately prior to the hinged cover reaching its closed position, resulting in a deviated path of the hinged cover from its opening position to its closing position. However, this requires a comparatively complicated mechanical structure.

DE 18 80 788 U is also known from the prior art. This invention relates to a cover plate that is equipped with a hinged cover and is particularly used for sockets in order to protect them from moisture and to attach them to the cover plate both discreetly and reliably. The cover plate having a rectangular shape and a removable closing spring in the form of a cylindrical coil spring being attached to the cover plate and the hinged cover by inserted pins. The disadvantage of this is that a hinged cover of this kind isn't provided with a defined opening position, and the helical spring would be over-twisted and deformed by exceeding the open position.

From DE 76 00 675 U, a plug coupling that provides a lockable socket lid and a lockable coupling state. This prior art specifically discloses a connection coupling that provides a closeable simple locking system in order to not only lock the socket lid closed in the decoupled state, but also to prevent the removal or loss of the plug from the connection in the coupled state by using the same key; both functions are achieved utilizing a locking body that is pivotable against a first spring. Hence, DE 76 00 675 U shows a device with a special key that can control a socket lid.

Document DE 11 41 714 A also relates to the prior art and describes a tubular wall light with a socket, that is attached to a bulkhead and closed by a hinged cover. The main disadvantage of this invention is the fact that the cover cannot be fixed open without the use of a foreign object, so that the spring element would be damaged.

U.S. Pat. No. 4,036,396 A describes a conduit box whose cover is connected to a coil spring and contains a bean-shaped slot for the rotational axis R which is obviously supposed to enable a corresponding control of the cover which would allow it to be fixed in position. Because of the bean-shaped slot for the axis of rotation, the cover has to be manually attached to the axis of rotation. The disadvantage of this is that the cover also has to be manually released from its position. Therefore, the user has to manually manipulate the attached cover in a way that the rotational axis of the cover is free to rotate again. The disadvantage of this is the fact that it isn't possible to control the position of the cover without a manual adjustment so that it can be fixed in an open position.

Another invention known from the prior art is DE 88 00 544 U1 which relates to a cover plate that is equipped with a hinged cover for the purpose of protecting a socket from moisture, using a closing spring which acts upon the cover.

Every device known from the prior art generally are characterized by the fact that the spring is not limited and would be deformed in case of inappropriate usage. Another disadvantage is the fact most devices known from the prior art can only be used to close a hinged cover. The hinged cover cannot be fixed in an open position, or the hinged cover can only be fixed in an open position if the user unhinges the axis of rotation, using, for example, a bean-shaped slot as described above.

By using special designs (adjustable wind diameter, molded rubber parts, air springs) springs whose force-distance relationship is not linear can be produced. Using non-linear springs has the advantage that the spring rate changes depending on the deformation of the spring. Shock-absorbing springs often act progressively which means that the spring force increases disproportionably to the compression of the spring. This prevents, for example, the spring from blocking against itself and accelerates the decay of oscillations. This is particularly desirable in the automotive industry. For example, stacked leaf springs and cone-shaped coil springs provide this characteristic. Springs with a digressive spring characteristic become softer with increasing load. This is desirable if another longer spring travel with a smaller increase in force after a certain loading is required. Digressive springs are for example rubber springs or tensile-loaded springs.

SUMMARY OF THE DISCLOSURE

The object of the present invention was to provide a spring with a simple structure for use with a spring-loaded hinged cover which acts with a high spring force upon the hinged cover in a closed position and with a low spring force if the hinged cover is in an open position. The hinged cover should be as simply and easily fixed in an open position and the spring should not be overloaded. In addition, the hinged cover should be closed using as little force as possible from the open position.

The stated problem is solved by means of a device comprising a hinged cover which is pivotable about an axis of rotation out of a closed final position in an open final position, and a flexible element which acts on the hinged cover with a force along a spring line of action. The flexible element is axially loaded in at least one final position of the hinged cover and is loaded with transverse forces in bending or extension in at least one further position. In the open position of the cover, the spring line of action approaches the axis of rotation of the hinged cover such that the cover can be fixed in the open final position, or in the open position of the cover, the spring line of action coincides with the axis of rotation of the cover such that the cover can be fixed in the open final position. In order not to damage the flexible element which is realized as a leaf spring or a coil spring, a blocking surface has been positioned such as the movement of the spring is such limited by this blocking surface that the leaf spring does not reach its transition point to bend in the other direction or that an overexpansion of the coil spring is prevented. In addition, the blocking surface can be preferably designed such that it limits the pivoting of the hinged cover about the axis of rotation such that it either reaches exactly a position where the spring line of action and the axis of rotation are coincident or that this position is only exceeded to a small extent. This distinction is necessary as, for example, due to material properties, the net weight and therefore the weight of the cover or the characteristics of the spring element may vary and a stable, self-retaining position must still be reached. In addition, the mass of the hinged cover or the resulting weight should be adjusted to the spring rate of the spring element. Another possibility of adjusting the spring, which can preferably be used for leaf spring, is to corrugate the spring. Corrugating the spring can also influence the buckling behavior and the stiffness of the spring.

If the spring line of action approaches, in the open position of the cover, the axis of rotation of the hinged cover, the torsional moment provided by the flexible element of the hinged cover is not sufficient to overcome the frictional resistance on the hinged cover. Therefore, the hinged cover does not move from the final open position. This state can be reached if the blocking position of the cover in the open position is designed such that the axis of rotation of the hinged cover and the spring line of action lie substantially on one line when opening the hinged cover. This ensures that only a minimal force is necessary in order to cause the cover to pivot into the closed position. If a minimal force acts on the cover, the own weight of the cover causes it to move from the open position, where the axis of rotation lies substantially on the axis of rotation in a closed position of the cover, to its closed position. The spring element is very important for this action because the cover is being moved out of its completely open position and the spring force of the spring element is activated again. In a position where the axis of rotation and the spring line of action coincide, this spring force can be neglected regarding the change of position of the cover since it acts directly on the axis of rotation. If the cover's position deviates in the direction of the closed position, this force acts on the cover again and thereby closes it independently.

The order of the spring element ends and the axis of rotation R is not important; it is rather important that all three points, which is to say the two spring element ends and the axis of rotation R, are coincident on a common axis. Therefore, a tension spring or a compression spring can both be used as a spring element. It is also possible to design a spring element using combinations of different spring elements.

In order to prevent rotational moments from acting on the spring element and to enhance the functioning of the device, a preferred embodiment is that at least one end of the flexible element is rotationally mounted. If both ends of the spring are mounted as hinges, the spring force acts along a line (spring line of action) between the two fixing points of the flexible element.

If the spring force coincides with the axis of rotation of the hinged cover or if it lies substantially on it, the spring force acts such that the hinged cover is held in an open position.

This is especially advantageous if a fixing point of the flexible element is positioned on the housing of the device and if the second fixing point of the spring element is positioned on the hinged cover in an eccentric position to the axis of rotation of the hinged cover.

One of the advantages of the present invention is first of all the high spring force that acts on the seal of the hinged cover without the spring force posing a risk of injury to the user. At the same time, the sealing material is not overloaded since the hinged cover has a fixed end position, and therefore the compression force between the housing and the seal is not particularly high. In addition, the spring force can hold the hinged cover in an open position which allows, for example, a single-handed usage of the socket. Nevertheless, the hinged cover can be easily closed by means of a low external force such that the protection of the enclosed electrical contacts from weather conditions, dirt and other external influences is enhanced.

In another preferred embodiment, the device comprises a blocking surface for the flexible element which is designed as a boss extrusion and limits the movement of the flexible element such that the transition point of the spring is not reached. This ensures that the flexible element can only deform in one direction. Depending on the force with which the blocking surface acts on the flexible element, it can ensure the hinged cover cannot be opened without a further unlocking action. This is the case if the flexible element bends over the transition point when in is not loaded. Alternatively, the blocking surface can be designed such that it acts with a certain force on the flexible element, so that the flexible element is slightly deformed and allows opening the hinged cover without any further unlocking.

Another alternative embodiment comprises an additional unlocking element in which the unlocking element acts on the flexible element such that it can be bent out of an axially loaded state. In this case it is preferable if the unlocking element is connected to the hinged cover. In another alternative embodiment, the unlocking element is attached to the fixed housing.

In another alternative embodiment, the unlocking element comprises an unlocking lever which is used to move the unlocking element. In addition, it is advantageous if a pivot joint connects the unlocking element to the hinged cover. It is also preferable if the device comprises an additional blocking surface on the hinged cover. As a consequence, the force that acts on the unlocking level when it is opened is transferred to the hinged cover, and the hinged cover can be opened after the device has been unlocked.

In another advantageous embodiment of the present invention, the loading state of the flexible element is changed by plugging another component such that the hinged cover can be closed by the spring force of the flexible element. This embodiment is especially preferred if the device is designed for the use in a socket with a spring-loaded hinged cover. The other component is preferably an electrical plug which is inserted into a socket. This is especially advantageous since the hinged cover independently closes as far as possible after inserting the plug and therefore protects the plug from external influences. Another advantage of this embodiment is the fact the hinged cover automatically closes when the plug is pulled out such that it doesn't require any additional intervention.

In another alternative embodiment of the present invention, a part of the hinged cover contacts another part of the housing in the open final position, such that a frictional resistance in the open final position is generated or that the hinged cover can be locked in the open final position.

In another advantageous embodiment, the flexible element acts on the hinged cover through an additional component. The additional component acts on the hinged cover in the closed final position with a force in the direction of closing. The advantage of this is the fact that the flexible element can be decoupled from the hinged cover. The additional component is preferably a locking lever. The additional inserted component is preferably a plug that is inserted in a socket. In this preferably embodiment, the locking lever can contact the inserted plug and act on it with an additional holding force. This provides an additional locking function on the inserted plug. A device of this kind is preferably used for electrical interfaces between vehicles and implements for agricultural machinery and attachments, (sockets acc. to ISO standard 11783-2)

In another advantageous embodiment, the blocking surface limits the pivoting about the axis of rotation in one direction. The blocking surface can be preferably designed such that it limits the pivoting of the hinged cover about the axis of rotation R such that it either reaches exactly a position where the spring line of action F and the axis of rotation R are coincident or that this position is only exceeded to a small extent. It is of high importance that the mass of the cover and the resulting weight are calibrated with the spring rate of the spring element.

The present invention also encompasses a power socket which is covered by a spring-loaded hinged cover and comprises a device according to the invention. In a preferable embodiment, the power socket is a connection socket for trailers. A power socket of this kind is often used for automobiles or delivery trucks where the insertion hole on the outside of the vehicle is designed to supply energy to a trailer or to use an electric motor on the outside of the vehicle.

DESCRIPTION OF THE DRAWINGS

The following drawings provide a more detailed overview of the invention. However, the invention is obviously not limited to the embodiments shown below. The drawings contain the following figures:

FIG. 1b) an example of a flexible element as a corrugated leaf spring and FIG. 1c) a perspective view of a corrugated ring-shaped leaf spring.

FIG. 7a) shows the hinged cover in a closed position, FIG. 7b) shows the hinged cover in an open position which is limited by a blocking surface;

FIG. 8a) shows the hinged cover in a closed position, FIG. 8b) shows the hinged cover in an open position which is limited by a blocking surface;

DETAILED DESCRIPTION OF PREFERRED EMBODIMENTS

Figure 1:
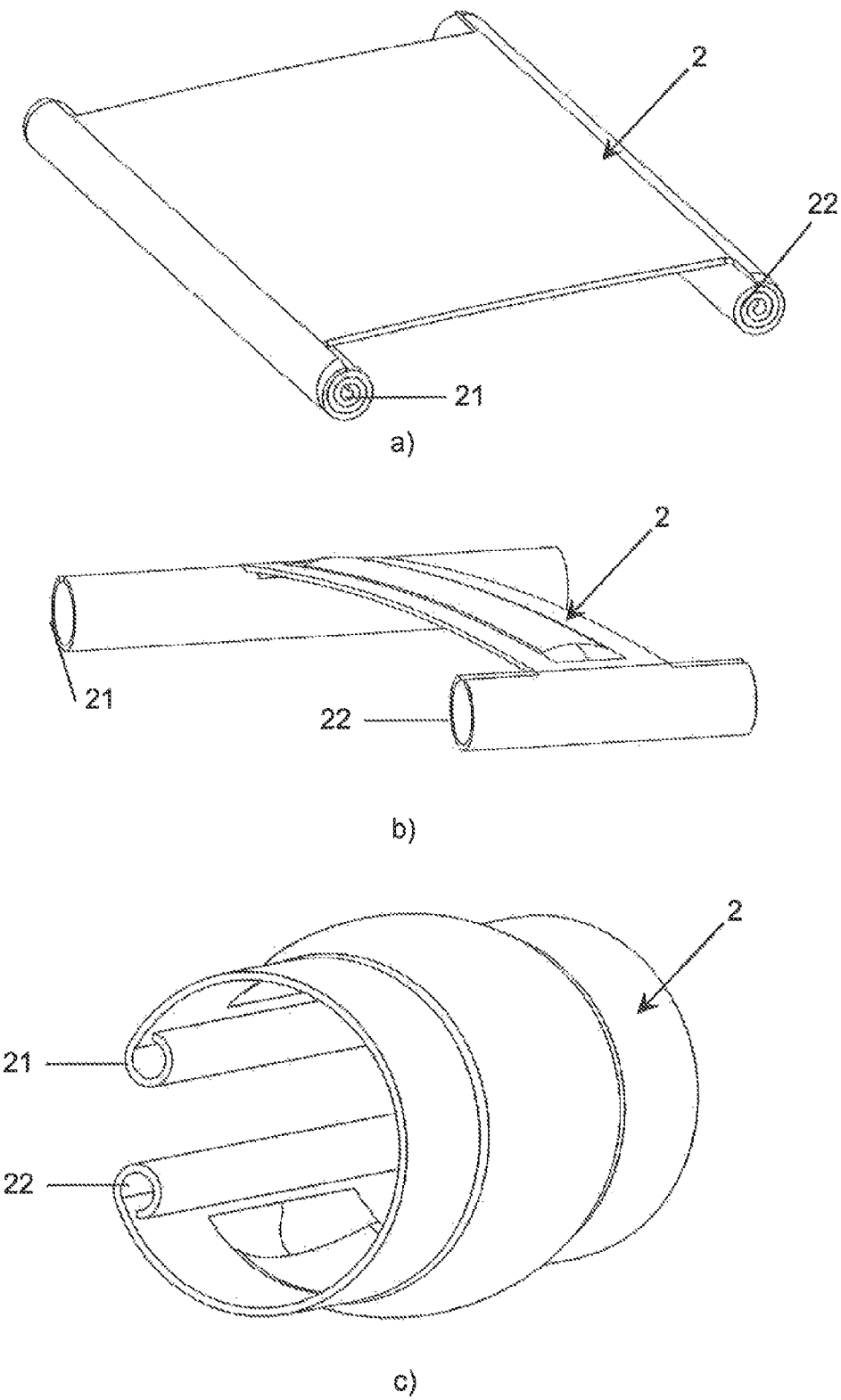
FIG. 1. shows a first embodiment of the device according to the invention, FIG. 1a) showing an example of flexible element in the form of a leaf spring.

FIG. 1. shows a first embodiment of the device according to the invention, whereas FIG. 1a) shows an example of the flexible element 2 in the shape of a leaf spring. This example of the embodiment shows the leaf spring in a non-loaded and non-deformed state. The thickness of the material used in this example embodiment is 0.25 mm and the diameter of the spring ends 21, 22 are approximately 2 mm each. FIG. 1b) shows another embodiment of the flexible element 2 which is designed as a corrugated leaf spring. The shape of the leaf spring in this example can be used to perfectly adapt the flexible element to the needs of the user with respect to stiffness, buckling behavior and the corresponding load. The diameters of the spring ends 21, 22 are designed such that they can be plugged in according holding bolts in this example.

FIG. 1c) shows an embodiment with an annular corrugated leaf spring. As previously shown in FIG. 1b) with the example of a leaf spring, corrugating a ring-shaped leaf spring allows the adaption the flexible element to the needs of the user with respect to stiffness and buckling behavior.

Figure 2:
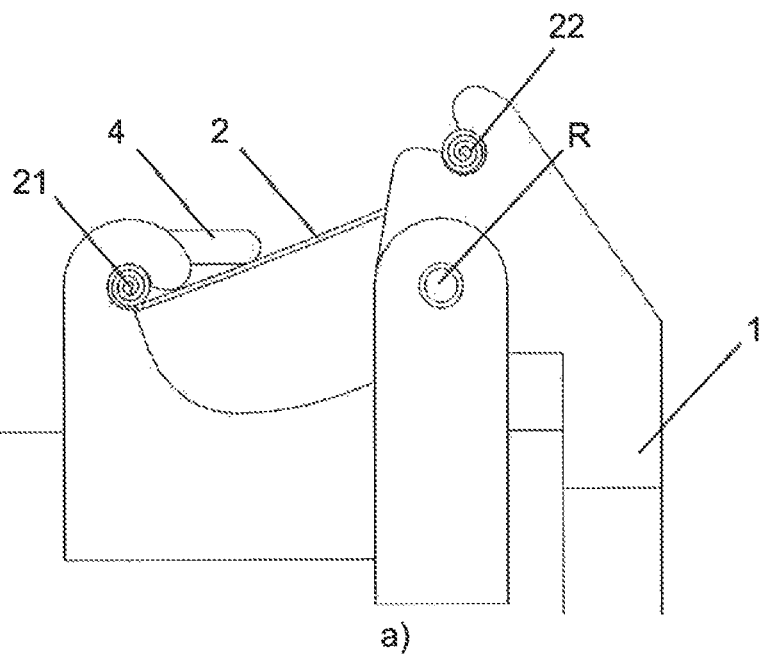
FIG. 2 shows a detailed view of the device of a power socket with the leaf spring shown in FIG. 1a), where FIG. 2a) shows the hinged cover in the closed final position and FIG. 2b) shows the hinged cover in a partially open position.
Figure 2:
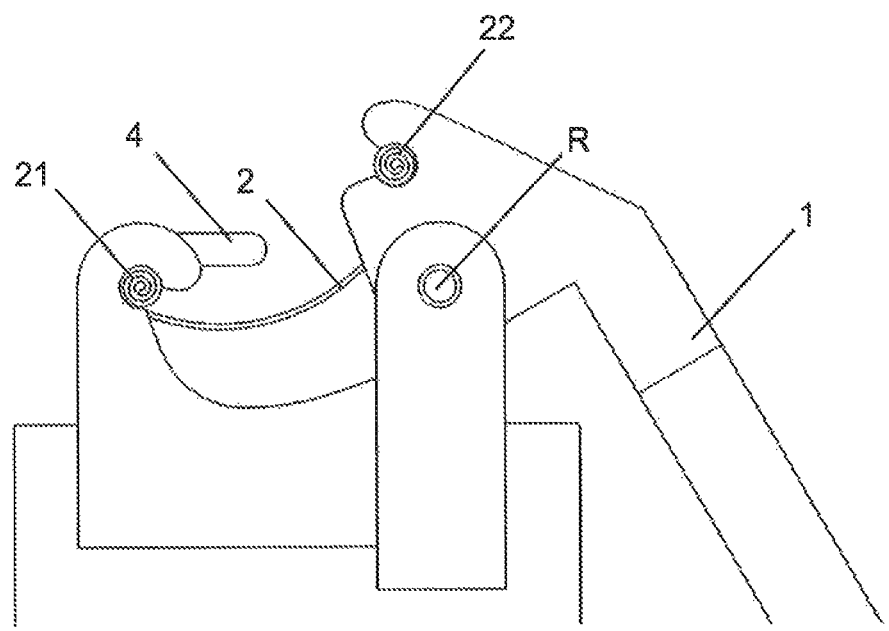

FIG. 2 gives a detailed overview of the device from FIG. 1, showing two different loading states of the leaf spring depending on the position of the hinged cover. Spring end 21 of the leaf spring is attached to the housing and spring end 22 of the leaf spring is attached to the hinged cover, both spring ends being rotationally mounted. Because of these pivot joints, the spring force acts along a line which connects the two spring ends. The hinged cover pivots about an axis of rotation R. FIG. 2a) shows the hinged cover 1 in the closed final position, the leaf spring 2 being axially loaded. The blocking surface 4 is designed such that the leaf spring isn't completely straight but slightly deformed. As a consequence, the transition point of the spring is not reached. The spring force now has to cause the leaf spring 2 to buckle, in order for the hinged cover to open again. FIG. 2b) shows the hinged cover 1 in a partially open position, the leaf spring 2 being loaded in bending perpendicular to the spring line of action, as the hinged cover is opened along the axis of rotation R. Because of the blocking surface on the housing 4, the leaf spring 2 deforms and moves away from the blocking position. The spring force which is generated in between the two pivot joints 21, 22 is a result of the bending of the leaf spring 2.

Figure 3:
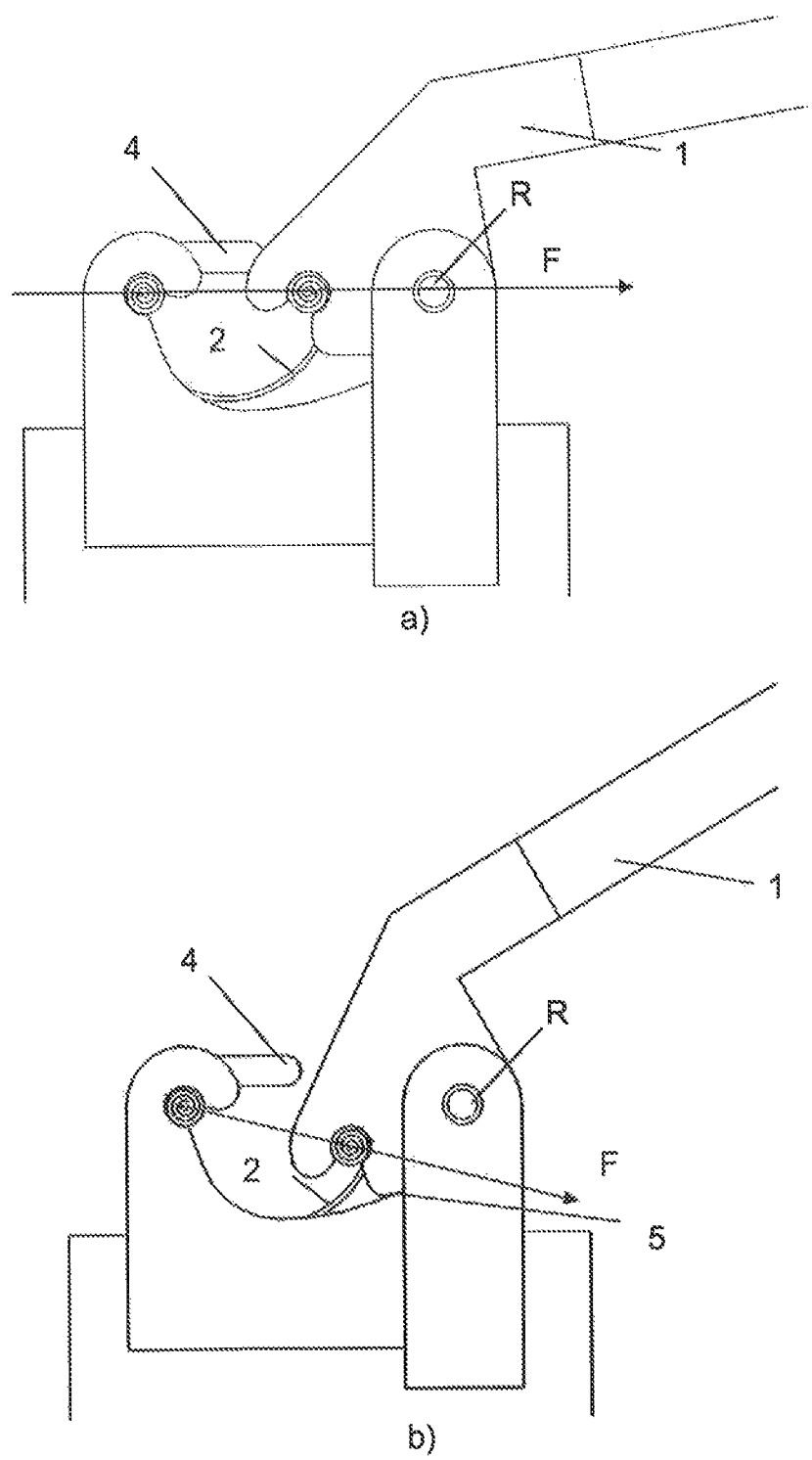
FIG. 3 shows the spring force that can act on the hinged cover along the spring line of action of the flexible element in the open final position, whereas FIG. 3a) shows how the spring line of action approaches to the axis of rotation of the hinged cover such that the hinged cover doesn't move in the open final position, or FIG. 3b) showing how the spring line of action crosses over the axis of rotation of the hinged cover such that the hinged cover is held in the open final position.

FIG. 3 shows the spring force which can act on the hinged cover 1 along the spring line of action F of the flexible element in an open final position. FIG. 3a) and FIG. 3b) each showing alternative design of the first embodiment. In FIG. 3a), the spring line of action approaches the axis of rotation R of the hinged cover 1. The moment of force with which the flexible element 2 acts on the hinged cover 1 is not sufficient to overcome the frictional resistance against the movement of the hinged cover 1. Therefore, the hinged cover 1 does not move in an open final position. In FIG. 3b), the spring line of action F crosses over the axis of rotation R of the hinged cover 1. As a consequence, the moment of force with which the flexible element 2 acts on the hinged cover 1 acts in the opening direction instead of the closing direction of the hinged cover. As a consequence, the force of the flexible element 2 holds the hinged cover open in the open final position. In addition, the device comprises a blocking surface on the housing such that the hinged cover cannot open any further.

Figure 4:
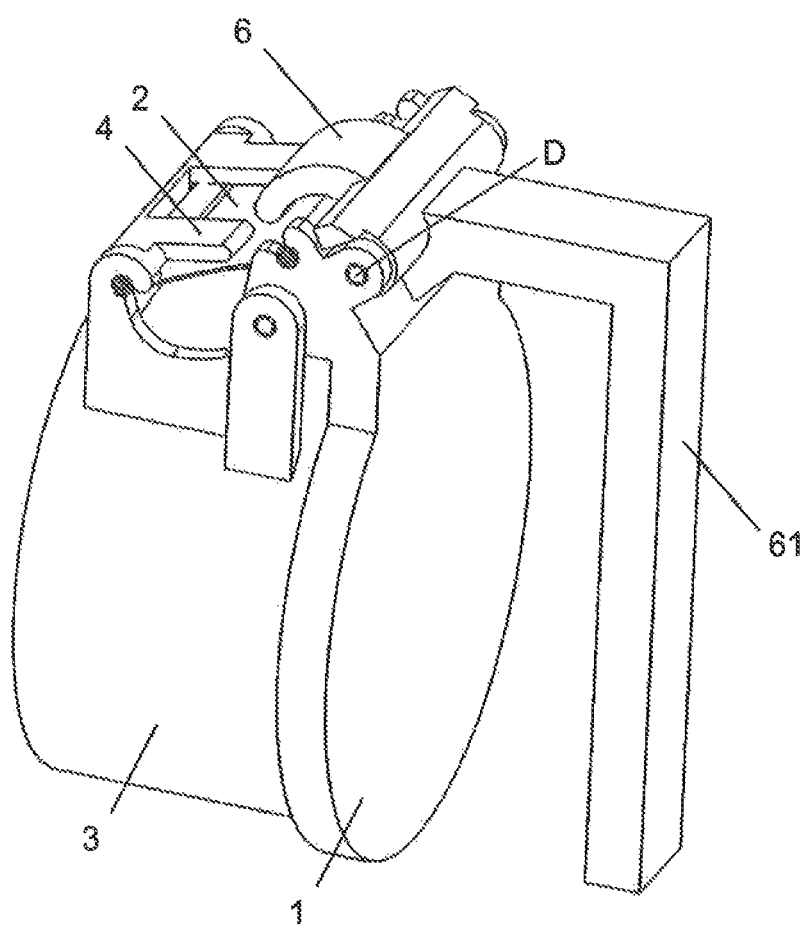
FIG. 4 gives an overview of a second embodiment of the device according to the invention that comprises an unlocking element.

FIG. 4 gives an overview of a second embodiment of the device according to the invention that comprises an unlocking element 6. The unlocking element 6 acts directly on the flexible element 2 and allows a movement of the hinged cover 1 out of a closed final position. In the closed final position, the hinged cover 1 lies on the housing 3 and a blocking surface 4 blocks the flexible element 2 such that it is not free to deform in the direction of the blocking position. For ease of use, the unlocking element 6 comprises an unlocking lever 61 which allows an easy opening of the hinged cover 1 out of the closed final position. For this purpose, the unlocking element 6 is connected with the hinged cover 1 and is rotationally mounted by a pivot joint D. The hinged cover 1 can be opened by lifting the unlocking lever 61.

Figure 5:
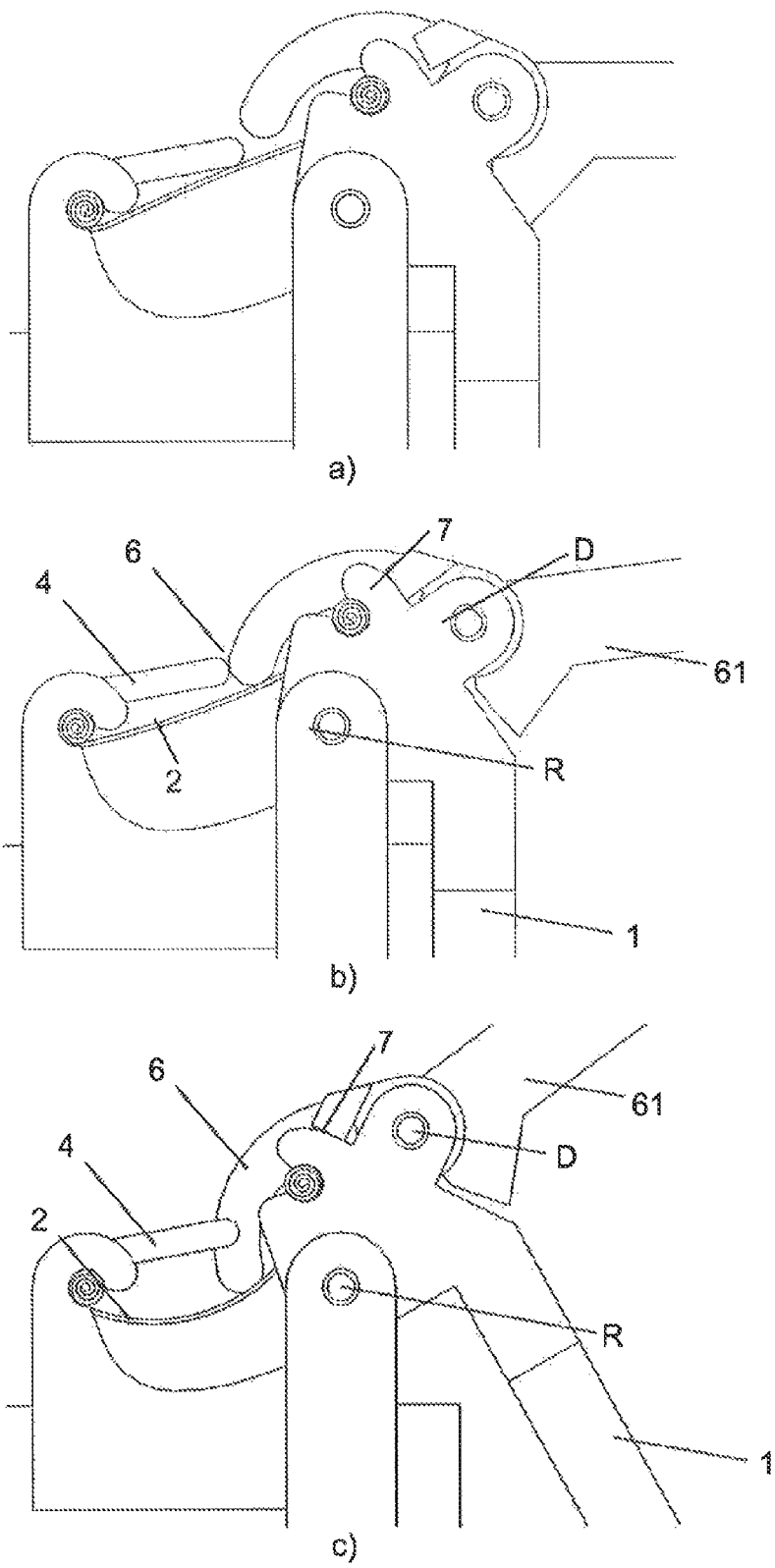
FIG. 5 gives a detailed overview of the device from FIG. 4, FIG. 5a) showing the hinged cover in a closed and locked position, FIG. 5b) showing the hinged cover in a closed and non-locked position and FIG. 5c) showing the hinged cover in a partially open position.

FIG. 5 gives a detailed overview of the second embodiment from FIG. 4, the individual views showing the different loading states of the flexible element depending on the position of the hinged cover and the unlocking element. FIG. 5a) shows the locked hinged cover in the closed final position. In the closed final position, the leaf spring 2 is bent to the other side such that it lies just over the transition point. If the hinged cover 1 is opened without the unlocking element unlocking it, the force acts on the leaf spring 2 such that it is deformed in the direction of the blocking surface 4. However, the blocking surface prevents the leaf spring 2 from buckling, so that the hinged cover cannot be opened. FIG. 5b) shows the state after the unlocking lever has been lifted. In this case, the unlocking element 6 acts on the leaf spring 2 and pushes it down and over the transition point. As a consequence, the leaf spring can buckle downwards where it is not blocked by the blocking surface 4. Another blocking surface 7 in between the unlocking element 6 and the hinged cover 1 transfers the force that acts on the unlocking lever 61 to the hinged cover 1 such that it can be opened after the leaf spring 2 has deformed in excess of the transition point which is shown in FIG. 5c). By attaching the unlocking lever 61 on the outside of the hinged cover 1, the user can open the unlocking element 6 together with the hinged cover 1 which allows a single-handed use. If a force acts on the hinged cover alone, the hinged cover 1 cannot be moved out of a closed final position because it is blocked by the leaf spring 2 and the unlocking element 6.

Figure 6:
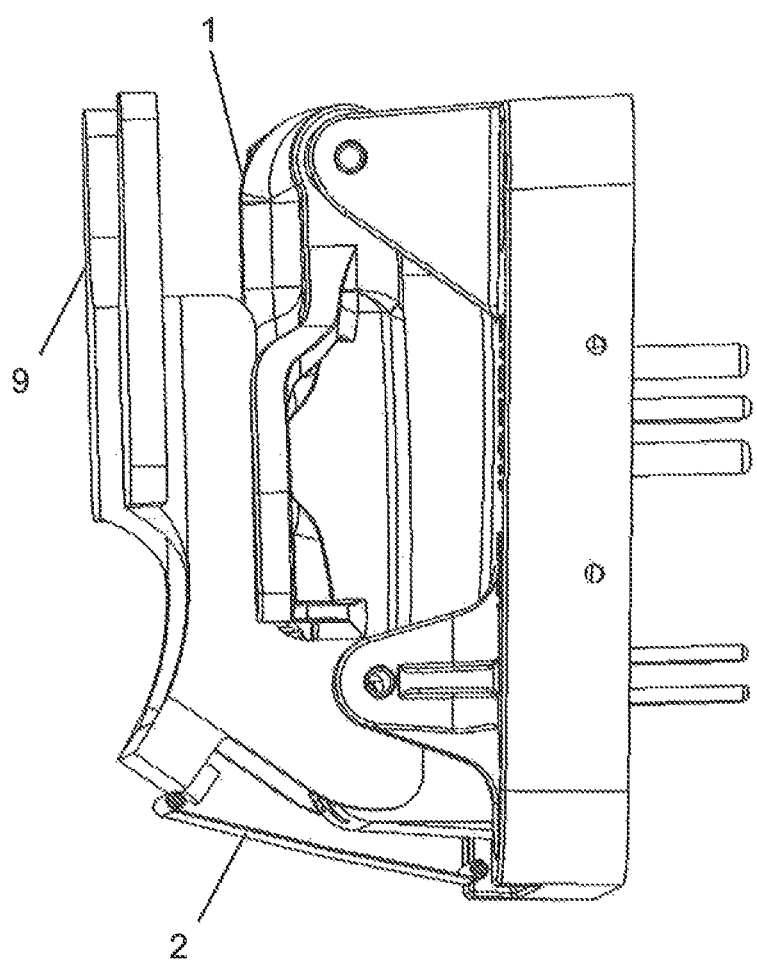
FIG. 6 shows an alternative embodiment of the device according to the invention.

FIG. 6 shows an alternative embodiment of the device according to the invention. In this design, one spring end is attached at the housing and the other spring end is connected to a locking lever 9. As a consequence, the leaf spring 2 acts on the hinged cover 1 over the locking lever 9. Since this alternative doesn't comprise a blocking surface on the housing, the leaf spring 2 is axially loaded in the closing final position of the locking lever. In this case, the spring force is much stronger than the spring force that is generated when the leaf spring buckles. Therefore, the spring can be used to close a locking lever 9.

Figure 7:
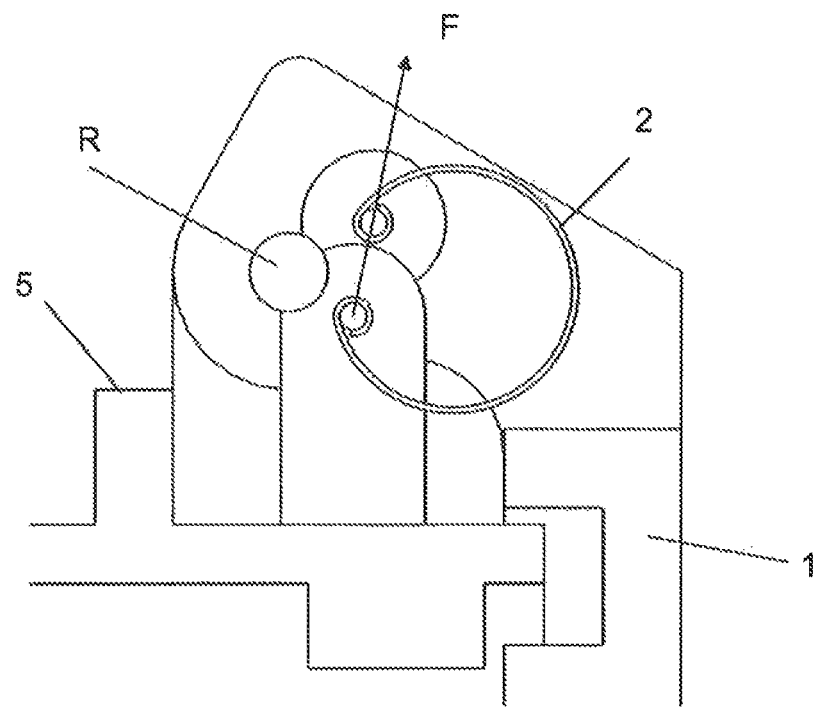
FIG. 7 shows another alternative embodiment in which the spring line of action and the axis of rotation R lie substantially on one line and in which the spring element is designed as a semi-circular leaf spring.
Figure 7:
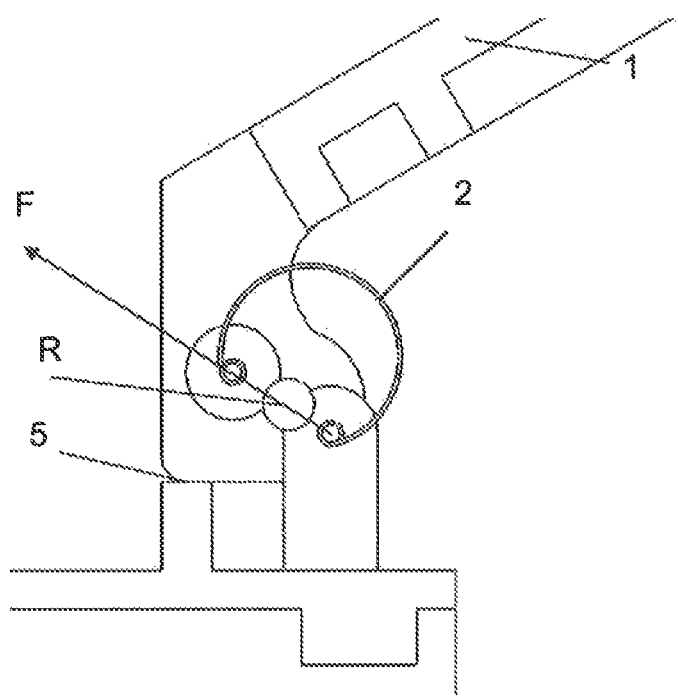

FIG. 7 shows an embodiment of the device according to the invention with a tension leaf spring as spring element 2 in which the embodiment comprises closed rings which are rotationally mounted on both spring element ends. FIG. 7a) shows a cross section of the device according to the invention in a closed position of the cover in which the geometrical relation of the axis of rotation R to the spring line of action F in the closed position of the cover can be observed. In the closed position of the cover, the three essential elements, which is to say both spring element ends and the axis of rotation R present a geometrical alignment which can be described as a triangle. If the cover 1 of the device according to the invention moved from the closed position in the open position is now as shown in FIG. 7b), the geometrical alignment, as shown in the example embodiment, changes such that all three points, which is to say both spring element ends and the axis of rotation R lie on a common axis. In FIG. 7b), the example embodiment comprises a blocking surface which limits the open final position of the cover. This blocking surface 4 is designed such that the geometrical alignment of the three elements is substantially on an axis but can also be described as a triangle where the interior angle is almost 180°. In this position, the cover of the device according to the invention holds itself in its position and will, after a corresponding adjustment of the spring rate of the spring element 2 to the weight of the cover 1, move out of the open position independently, into the closed position with the application of very little force, for example tapping or vibration when an automobile is started. The necessary spring force is generated from the position of the cover which is below the position in which the three elements mentioned above lie on a common axis.

Figure 8:
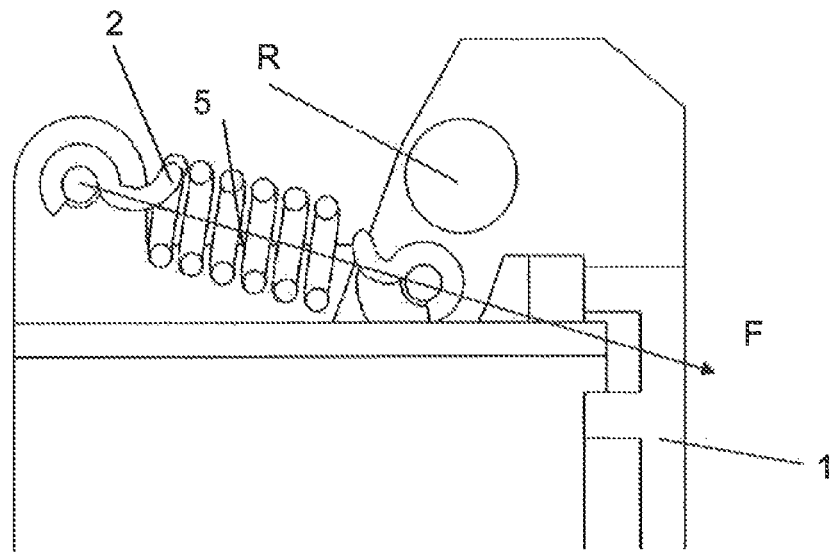
FIG. 8 shows another alternative embodiment in which the spring line of action and the axis of rotation R of the hinged cover lie substantially on one line and in which the spring element is designed as a spiral tension spring.
Figure 8:
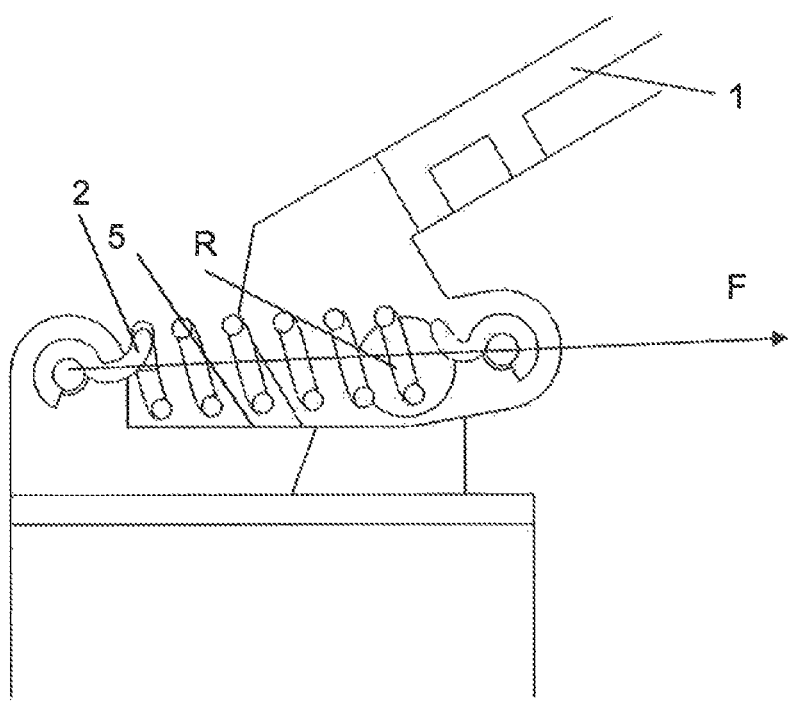

FIG. 8 shows an alternative embodiment of the device according to the invention which uses a coil spring as a spring element 2, both spring element ends being designed as open rings. In this embodiment, the coil spring is designed as a tension spring. FIG. 8a) shows a cross section of the device according to the invention in a closed position of the cover where the geometrical relation of the axis of rotation R to the spring line of action F in a closed position of the cover can be observed. Both spring element ends and the axis of rotation R show also here a geometrical alignment which can be described as a triangle. FIG. 8b) shows the invention in the open position of the cover and the position of both spring element ends to the axis of rotation R which has been modified accordingly to the function. By changing the position of the cover, the triangular alignment of the three elements as shown in FIG. 8a) is dissolved and the three elements now substantially lie on a common axis which also causes the cover to hold itself in an open position independently. The geometrical alignment of the three elements is once again caused by the blocking surface 4 which limits the movement of the hinged cover 1 in one direction.

Figure 9:
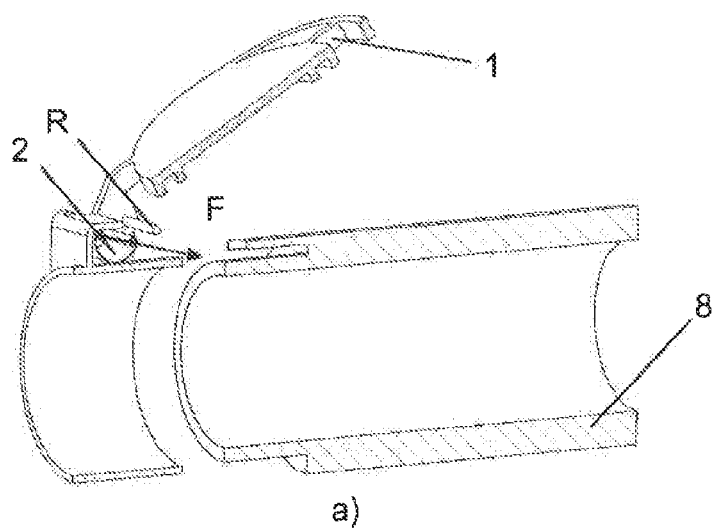
FIG. 9 shows another embodiment of the device according to the invention in which the loading condition of the flexible element is modified by inserting another component, FIG. 9a) shows the state before the insertion of the component, FIG. 9b) shows the state during the insertion of the component and FIG. 9c) shows the state after the insertion of the component.
Figure 9:
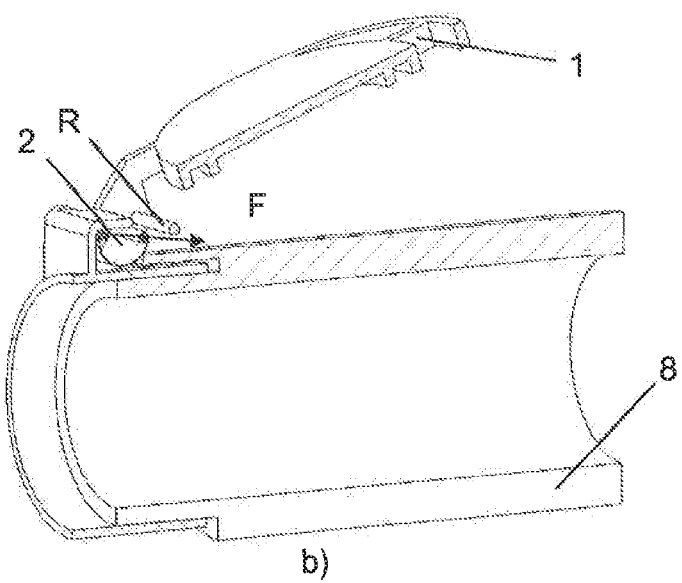
Figure 9:
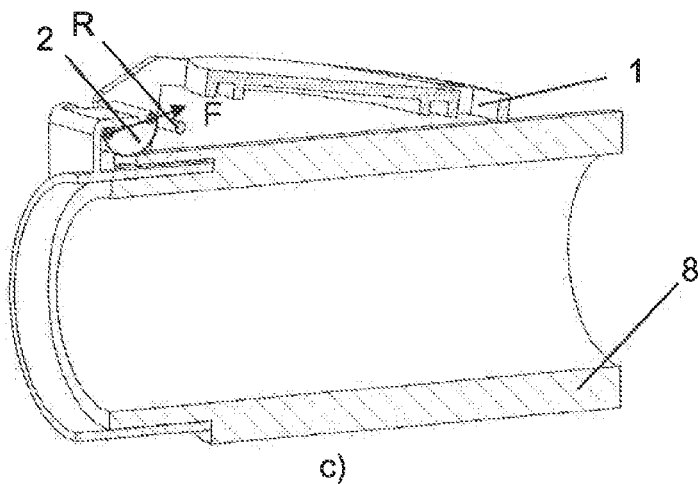

FIG. 9 shows another alternative embodiment of the device according to the invention in which the loading state of the flexible element is modified by inserting another component, FIGS. 9a), 9b) and 9c) show the different loading states of the leaf spring. In this example embodiment, the other component is preferably an electrical plug which is inserted in a socket according to the invention. FIG. 9a) shows the state before the plug 8 is inserted, with the hinged cover 1 in the open final position. The leaf spring 2 is loaded in bending, and since the spring force that acts along the spring line of action F coincides with the axis of rotation R of the hinged cover, the hinged cover is held in the open final position. FIG. 9b) shows the device while the plug is being inserted, the plug 8 acts on the leaf spring 2 and deforms it such that the spring line of action shifts. The state after the plug has been inserted can be observed in FIG. 9c). Since the plug 8 acts on the leaf spring 2, it is deformed such that the spring line of action F doesn't coincide with the axis of rotation R of the hinged cover anymore. Therefore, the hinged cover 1 closes independently until it lies on the plug 8.

Figure 10:
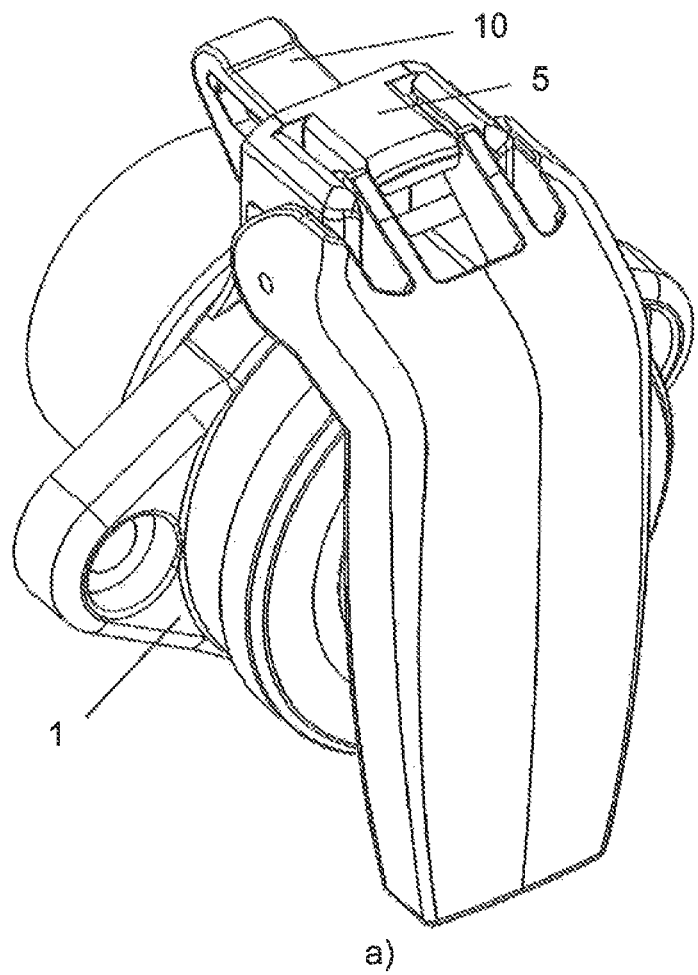
FIG. 10 shows another embodiment of the device according to the invention in which the flexible element is additionally protected from external influences by a cover, FIG. 10a) shows a perspective view of this embodiment and FIG. 10b) shows an axial section of the device according to the invention.
Figure 10:
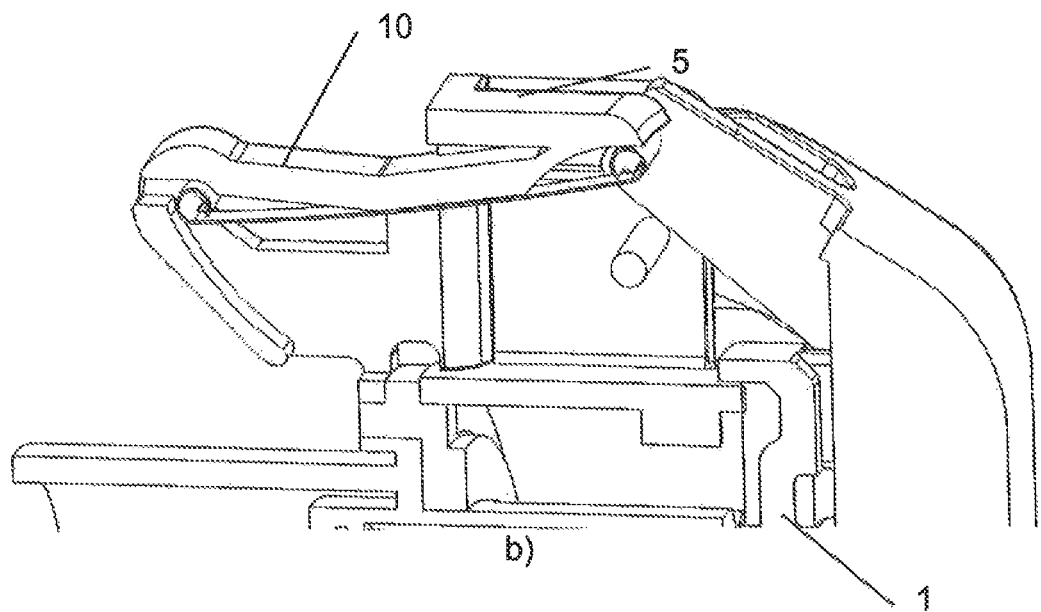

FIG. 10a) shows an example of a protection 10 for the flexible element which is designed to protect the flexible element from external influences such as dust and water. The protection 10 for the flexible element 2 is closed against the upper side of the device depending on the fixing, for example with the metal plate of a tow bar coupling. If the connectors were attached, for example, to such a tow coupling, the connectors would be protected by the hinged cover 1, but the spring, regardless of its nature, would be exposed for geometrical reasons and could be damaged by the water jet of a steam cleaner for instance. In order to prevent this, the protection 10 mentioned above for the flexible element 2, which is shown in the example embodiment, is integrated with the device such that it butts against a metal plate such that the flexible element 2 is protected from dust and water. It is important that the function of the device is not limited by the inclusion of a protection for the corresponding components. In addition, the advantageous embodiment of the protection 10 shown above, prevents an unwanted opening of the hinged cover 1 because the flexible element 2 is protected from, for example, a water jet which could move the flexible element 2 out of its current position. The embodiment of this protection shown in FIG. 10b) shows that the flexible element 2 is protected from directional external influences by this protection.

LIST OF REFERENCE CHARACTERS 1 hinged cover
11 space in hinged cover for rubber seal
2 flexible element
21, 22 ends of the flexible element
3 housing
4 blocking surface for flexible element
5 blocking surface for hinged cover
6 unlocking element
61 unlocking lever
7 blocking surface for unlocking element
8 component (plug), which is inserted in the socket
9 locking lever
10 protection for the flexible element
F spring line of action
R axis of rotation of the hinged cover
D pivot joint of the unlocking element

The invention claimed is:

1. An enclosure, comprising a hinged cover which is pivotable about an axis of rotation out of a closed final position into an open final position, and a flexible element which acts upon the hinged cover with a force along a spring line of action, wherein:
   the flexible element is axially loaded in at least one final position of the hinged cover and is loaded with transverse forces in bending or tension in at least one further position, and
   in the open position of the hinged cover, the spring line of action approaches the axis of rotation of the hinged cover or lies substantially on the axis of rotation of the hinged cover such that the hinged cover reaches a stable self-supporting state in the open final position, or
   in the open position of the hinged cover, the spring line of action crosses over the axis of rotation of the hinged cover such that the hinged cover reaches a stable self-supporting state in the open final position, and
   wherein the enclosure comprises a blocking surface for acting on the flexible element and the movement of the flexible element is limited by the blocking surface for acting on the flexible element such that a transition point of the flexible element is not exceeded, and/or that the enclosure comprises a blocking surface for the hinged cover with the blocking surface for the hinged cover limiting the movement of the hinged cover such that the hinged cover can not exceed the final open position, and
   the flexible element is a leaf spring and at least one end of the spring element is rotationally mounted.

2. Enclosure according to claim 1, wherein a buckling or extension of the flexible element is required for the hinged cover to pivot out of the closed final position.

3. Enclosure according to claim 1, wherein the blocking surface for acting on the flexible element is configured as a flange and/or is integrated in a housing.

4. Enclosure according to claim 1, wherein the flexible element includes one or several corrugations.

5. Enclosure according to claim 1, comprising an additional unlocking element in which the unlocking element acts upon the flexible element such that the flexible element can be bent out of an axially loaded state.

6. Enclosure according to claim 5, wherein the unlocking element comprises an unlocking lever and that a pivot joint connects the unlocking element to the hinged cover and/or a housing.

7. Enclosure according to claim 1, wherein the loading state of the flexible element is modified by inserting another component such that the hinged cover is closed by the spring force of the flexible element.

8. Enclosure according to claim 1, wherein a part of the hinged cover contacts another part of a housing in the open final position such that a frictional resistance is generated in the open final position or that the hinged cover can be locked in the open final position.

9. Enclosure according to claim 1, wherein the flexible element acts on the hinged cover over a locking lever and/or that the locking lever acts with a force on another inserted component.

10. Enclosure according to claim 1, wherein the flexible element comprises a mechanical protection against external influences.

11. A socket covered by a hinged cover device, wherein the cover device comprises the enclosure recited in claim 1.

* * * * *